United States Patent Office

3,424,591
Patented Jan. 28, 1969

3,424,591
HYDROCOLLOID SURFACE TREATMENT TO YIELD FRENCH FRIED POTATO PRODUCTS
William L. Gold, Midland, Mich., assignor to The Dow Chemical Company, Midland, Mich., a corporation of Delaware
No Drawing. Filed June 9, 1965, Ser. No. 462,715
U.S. Cl. 99—100     8 Claims
Int. Cl. A23l 1/12

ABSTRACT OF THE DISCLOSURE

Surface treatment of potato pieces with a synthetic or chemically modified natural hydrocolloid prior to deep fat frying yields French fried potato products having a lighter more even color, a firmer texture, a higher residual moisture content, and a reduced oil content.

---

A sizable institutional and consumer market has developed for frozen, partially fried potato products which require only brief reheating and further cooking before serving. Currently these potato products are prepared by peeling, cutting and trimming selected raw potatoes into slices, pieces or strips of suitable size and shape. Then the cut, raw potato pieces are sorted and partially cooked or "blanched" in steam or hot water at 65°–95° C. for 3–10 minutes. The blanched potato pieces are dewatered and fried in hot fat or vegetable oil. For par-fries, the blanched potato pieces are totally submerged for 30–75 seconds in oil at 170°–200° C. After draining excess oil, the par-fries are quick-frozen and packaged.

Potatoes are a natural product having a variable chemical and physical composition. Their cellular structure and chemical composition, e.g. the amount of reducing sugars, moisture, solids, protein, carbohydrate etc., is particularly sensitive to growing and storage conditions. Although many of the chemical and biological reactions which occur within the potato have been studied, the processor handles a highly varied product since he generally has little control over these factors.

To minimize the effect of raw material variations, processors often incorporate chemical treatments in a process line to produce a more acceptable and uniform product. For example, chelating agents are used to remove or inactivate trace amounts of undesirable heavy metal ions, particularly iron and copper. A sugar such as dextrose or glucose is often added to provide a richer color. Calcium lactate can be used as a stiffening agent to improve the physical appearance and plate life. Such chemical treatments are readily adapted and controlled on the process line to achieve optimum results.

The present invention concerns an improved process for preparing French fried potato products from whole potato pieces. The improvement consists essentially in treating the surface of the cut whole potato pieces with an aqueous solution of a suitable edible synthetic or chemically modified nautral hydrocolloid to form a thin coating or film of the hydrocolloid on the potato surfaces prior to deep fat frying. As a result of this treatment the product after French frying has superior color and other improved properties including enhanced texture and a higher moisture, reduced oil content. By appropriate choice of the film-forming hydrocolloid and process conditions, such improved properties can be achieved individually or preferably concurrently.

In practice it has been found most advantageous to treat partially cooked potato pieces with an alkyl cellulose ether such as hydroxypropyl methylcellulose or sodium carboxymethylcellulose in aqueous solution at 50°–100° C. Furthermore the aqueous hydrocolloid solution used to treat the potato pieces should preferably have a viscosity of 10–100 cps. at the normal operating temperature. Advantageously the treatment is carried out by dipping the blanched potato pieces for a few seconds in a preheated aqueous solution of the hydrocolloid.

FILM-FORMING HYDROCOLLOIDS

An essential element in the present invention is the surface coating or film of synthetic or chemically-modified natural hydrocolloid applied to the potato pieces prior to immersion in the frying oil. Although in some instances the film-forming hydrocolloid may penetrate to a depth of several cellular layers, essentially a thin surface film is required. To reduce oil absorption a substantially continuous, oil-resistant film is required. Yet, the film must also have adequate water vapor transmission properties to prevent rupture during French frying at higher temperatures.

Suitable hydrocolloids for use in the present process are film-forming, water-soluble, synthetic and chemically-modified natural carbohydrate polymers. As used herein the term "synthetic hydrocolloid" refers to hydrocolloids prepared by partial hydrolysis of natural cellulose and subsequent chemical modification by etherification, carboxymethylation, or similar reaction. The term "chemically-modified natural hydrocolloid" refers to hydrocolloids prepared by chemical modification of a natural carbohydrate polymer. These are widely recognized trade definitions.

Particularly suitable and preferred for optimum results are water-soluble, nonionic cellulose ethers which form thermally reversible gels in aqueous solutions. Typical materials include methylcellulose, ethylcellulose, hydroxypropylcellulose, hydroxypropylmethylcellulose, hydroxyethycellulose and similar synthetic cellulose ethers. Other suitable synthetic hydrocolloids include such ionic alkyl cellulose ethers are carboxymethyl cellulose, carboxymethyl ethyl cellulose, carboxymethyl hydroxyethyl cellulose and their water-soluble salts.

In addition suitable hydrocolloid films can also be prepared from chemically-modified natural carbohydrate polymers. For example, hydroxypropyl alignates and hydroxypropyl starch also give edible hydrocolloid films useful in the process described herein.

Preferred hydrocolloids for optimum results in practice are water-soluble alkyl cellulose ethers and particularly hydroxyalkyl cellulose ethers. These products, which can be prepared for example by the process described by Savage in U.S. Patents 2,831,852 and 2,835,666, normally contain for maximum water-solubility an alkyl degree of substitution (D.S.) ranging from about 1.15 to 2.00. With methylcellulose, maximum water-solubility occurs with a methoxyl D.S. of 1.64–1.92. With hydroxypropylmethylcellulose, a methoxyl D.S. of 1.08–7.82 and a hydroxypropoxy D.S. of 0.07–0.30 is preferred.

By appropriate control of the degree of partial hydrolysis of the cellulose prior to chemical modification, the chain length or molecular weight of the cellulose ether and hence its effective viscosity in aqueous solution can be widely varied. Conventionally the viscosity of commercial alkyl cellulose ethers is expressed in centipoises (cps.) as determined with a capillary viscometer and a 2 weight percent aqueous solution at 20° C. (ASTM method D1347–64). The viscosity of the alkyl cellulose ethers useful herein can range from 10–15,000 cps. at 20° C.

The choice of the film-forming hydrocolloid is also governed by process factors. It is generally advantageous to treat the potato pieces between the blancher and frier. Therefore to minimize cooling of the blanched pieces it is desirable to have an operational temperature of about 50°–95° C. for the aqueous hydrocolloid solution. Hence for most commercial operations a hydrocolloid with a thermal gel point greater than 50° C. is essential.

A particularly important process parameter is the viscosity of the aqueous hydrocolloid solution at the operating temperature. Proper control of this operational viscosity is critical in obtaining a desirable uniform surface coating with an acceptable contact time and rapid drain-off of excess solution. This viscosity is governed primarily by the nature of the hydrocolloid, e.g. by its inherent viscosity or molecular weight, its concentration and the operating temperature.

It has been found that with a normal operating temperature between about 50°–95° C., the hydrocolloid solution should have an operational viscosity less than 100 cps. and preferably between 40–80 cps. With an operational viscosity within these limits, adequate carryout of the hydrocolloid to improve the quality of the French fried products is obtained with a contact time of about 0.1–5 minutes.

The operational viscosity of a hydrocolloid at 50–95° C. is not directly proportional to the 2 percent aqueous viscosity at 20° C. particularly with a thermally gelling hydrocolloid. In general a 0.5–10 weight percent aqueous solution of the colloid is desirable. For example, with a preferred synthetic hydrocolloid, hydroxypropylmethylcellulose, a 1–4 percent solution of a product having a standard 2 percent aqueous solution viscosity of 100–500 cps. at 20° C. is particularly well suited for use herein.

The amount of film-forming hydrocolloid required on the potato surface for effective results is small. For normal potato strips a hydrocolloid pickup or carryout of about 0.02–0.5 weight percent based on the weight of treated potato pieces is adequate. However, optimum pickup will depend on process conditions as well as the specific hydrocolloid.

Since the hydrocolloid film functions not only to minimize oil absorption, but also to control moisture loss, the amount of hydrocolloid on the potato surface, e.g. the film thickness, is important. A too thin film provides inadequate oil-resistance and permits a high moisture and yield loss. Yet a heavy coating impairs the development of a uniform color and often leads to the rupture of the film from excessive internal pressure during frying. This permits entrapment of oil and causes an undesirable mottled or speckled surface color. However, proper control of the pickup can be achieved in practice by adjustment of the viscosity and temperature of the aqueous treating solution and the contact time.

PROCESS CONDITIONS

The improved French fried potato products described herein can be obtained in commercial practice by treating the whole potato pieces in any desired form, e.g., slices, straight or crinkle strips, dices, etc., with the aqueous hydrocolloid solution at about 50°–95° C. under atmospheric pressure. The treatment conveniently is accomplished by contacting the blanched potato pieces with a preheated hydrocolloid solution for a time sufficient to form the desired surface coating prior to frying in deep fat. Preferably the blanched potato pieces are passed through a dip tank containing the aqueous solution of the hydrocolloid and any other desired additives such as sugar, drained for a few moments, and then fried. However, other techniques including spray coating and treating in a transfer trough or flume can also be used.

Within the general scope of the present invention optimum conditions for a given hydrocolloid and process system can be readily determined by those skilled in the art. As noted above it is particularly desirable that the hydrocolloid solution have an operational viscosity of 100 cps. or less, and preferably 40–80 cps., to achieve the desired surface coating at an operational temperature of about 50°–95° C.

By the improved process of the present invention French fried potato products are obtained which have a lower absorbed oil content, a higher moisture content, a lighter and more uniform color, and a firmer texture. Furthermore by choice of the hydrocolloid and control of the process conditions these properties can be achieved individually or preferably concurrently.

The oil-resistant hydrocolloid film reduces the absorption and consumption of the frying oil. Use of a hydrocolloid which forms a thermally reversible gel in aqueous solution provides improved control of the moisture vapor transmission during frying. Thus superior moisture retention is achieved and the process yield increased. In addition through an unexplained mechanism the surface hydrocolloid film enhances the formation of a uniform, light color during frying and also imparts desirable plate life characteristics. While these advantages are particularly desirable in the production of par-fries, the process can also be used in the production of other French fried potato products.

To illustrate further the present invention and its advantages, the following examples are given without limiting the invention thereto. Unless otherwise specified, all parts and percentages are by weight and the viscosities are determined by the method of ASTM D1347–64.

EXAMPLE 1.—Laboratory tests (A) A lot of Russett Burbank, U.S. No. 1 Size A potatoes containing 18.6 percent solids was conditioned overnight at about 20° C. They were manually peeled and cut into ⅜ x ⅜ x 2¼–2½″ pieces. A 120 g. sample of the cut strips was blanched at about 82° C. for 8 min. Then it was dipped into a 2.75 percent dextrose solution at 75° C. for 30 seconds. After draining for 30 seconds, the sample was divided.

One portion of the sugar-treated strips was immediately par-fried at about 180° C. for 1 min. in a conventional deep fat frier. The par-fries were drained for 30 sec. over the hot fat and for 4.5 min. at room temperature before taking samples for analysis. The remaining pieces were frozen for later evaluation.

A second weighed portion of the sugar-treated strips was dipped for 30 sec. into an aqueous solution of the test hydrocolloid heated at about 60° C., drained for 30 sec., reweighed, and then par-fried and sampled as above. The hydrocolloid pickup was determined from the drained sample weights before and after treatment.

The par-fried samples were analyzed for residual moisture and absorbed oil by two standard methods. In one method a finely divided sample is dried to constant weight in vacuo at 90° C. and then extracted for 16 hours with methylene chloride, dried and reweighed. From the weight losses, the moisture and absorbed oil contents are calculated. Alternately, a finely divided sample is suspended in dry toluene and the water removed by azeotropic distillation. Then the extracted oil in the toluene is determined by infrared analysis.

(B) Using the procedure described above, par-fried potato strips were prepared by a process including a dip treatment at 60° C. with the following edible commercial synthetic hydrocolloids:

Methocel 90HG premium.—A water-soluble hydroxypropylmethylcellulose produced by The Dow Chemical Company having a methoxyl D.S. of 1.08–1.42 and a hydroxypropoxy D.S. of 0.10–0.30;

Methocel MC premium.—A water-soluble methylcellulose produced by The Dow Chemical Company having a methoxyl D.S. of 1.62–1.92;

CMC–7LP.—A water-soluble carboxymethyl cellulose produced by Hercules having a carboxymethyl D.S. of 0.65–0.85 and a Brookfield 2 percent aqueous solution viscosity of 25–50 cps. at 25° C.; and CMC–7MP.—A water-soluble carboxymethyl cellulose produced by Hercules having a carboxymethyl D.S.

of 0.65–0.85 and a Brookfield 2 percent aqueous solution viscosity of 300–600 cps. at 25° C.

Typical results are given in Table 1. In all cases the moisture and absorbed oil content are average values from several determinations.

TABLE 1.—PAR-FRY MOISTURE AND OIL CONTENT

| Run | Hydrocolloid solution | Opn. visc.,[1] cps. | Pickup, weight, percent | Par-fries Percent water loss | Par-fries Percent oil | Reduction in— Water loss, percent | Reduction in— Oil absorp., percent |
|---|---|---|---|---|---|---|---|
| 1-1 | None (control) | | | 11.1 | 5.98 | | |
| 1-2 | 1.5% Methocel 90HG, 100 cps.[2] | 11 | 0.02 | 10.4 | 5.45 | 6 | 9 |
| 1-3 | 2.5% Methocel 90HG, 100 cps.[2] | 48 | 0.14 | 9.6 | 4.13 | 14 | 31 |
| 1-4 | 4.0% Methocel 90HG, 100 cps.[2] | 217 | 0.53 | 10.4 | 6.03 | 6 | −1 |
| 1-5 | 2.0% Methocel 90HG, 400 cps.[2] | 47 | 0.13 | 10.5 | 5.38 | 5 | 10 |
| 1-6 | 3.0% Methocel 90HG, 400 cps.[2] | 345 | 0.33 | 10.0 | 5.20 | 10 | 13 |
| 2-1 | None (control) | | | 9.7 | 4.86 | | |
| 2-2 | 2.5% CMC–7LP, 25–50 cps.[3] | 18 | 0.04 | 9.5 | 4.38 | 2 | 10 |
| 2-3 | 3.5% CMC–7LP, 25–50 cps.[3] | 53 | 0.08 | 10.3 | 4.34 | −6 | 11 |
| 2-4 | 2.0% CMC–7MP, 300–600 cps.[3] | 133 | 0.08 | 9.6 | 4.30 | 1 | 12 |

[1] Operational viscosity at 60° C. (ASTM D1347-64).
[2] 2% aqueous solution viscosity at 20° C. (ASTM D1347-64).
[3] 2% aqueous solution viscosity at 25° C. (ASTM D1439-56T).

(C) For comparison, another sample of blanched potato strips was cooled to room temperature, dipped into a 2% aqueous solution of methylcellulose having a viscosity of 400 cps. at 20° C. The solution had an operational room temperature viscosity of about 350 cps. The drained strips had a methylcellulose pickup of about 0.42 wt. percent. The par-fries had a water loss of 10.4% and contained 5.11% oil, a significant improvement in both properties compared with untreated par-fries.

The data in Table 1 and Example 1C show that surface treatment with Methocel 90 HG premium, Methocel MC premium, CMC–7LP and CMC–7MP gave a marked decrease in the oil absorption of the par-fries. Note, however, that the carboxymethyl cellulose treatment gave no appreciable reduction in the moisture loss whereas Methocel 90 HG and Methocel MC, which form thermal gels at the frier temperature, did reduce the moisture loss significantly. A similar treatment with calcium lactate, a non-film forming hydrocolloid, had no evident effect on the oil absorption or moisture loss.

In addition to the given analyses the color and firmness of the par-fries were visually determined. With a surface coating of up to about 0.5 weight percent Methocel 90 HG or Methocel MC, the treated par-fries were lighter and more even in color as well as firmer in texture. The interior of the treated pieces was mealy, moist and substantially greaseless. With a heavier surface coating of the alkyl cellulose ethers, the surface of the par-fries was often mottled or cobbled. This effect was also accompanied by an increased oil content. Although the critical level varies with the properties of each particular hydrocolloid, a similar effect is found with different synthetic and chemically-modified natural hydrocolloids.

EXAMPLE 2.—Methocel 90 HG dip treatment

Using the general procedure described in Example 1A, the influence of several process variables was examined using several viscosity grades of Methocel 90 HG. The runs of Series 3 were made using a laboratory treatment of blanched potato strips taken from a commercial par-fry line. In Series 4 the treated strips were fried in new oil, in Series 5 in reused oil.

TABLE 2.—METHOCEL 90HG TREATMENT

| Run | Hydrocolloid solution [1] | Opn.[2] visc., cps./50° C. | Pickup, weight percent | Par-fries Percent water loss | Par-fries Percent oil | Reduction in— Water loss, percent | Reduction in— Percent oil |
|---|---|---|---|---|---|---|---|
| 3-1 | None (control) | | | 11.0 | 5.11 | | |
| 3-2 | 3.25% Methocel 90HG, 100 cps | 200 | | 8.5 | 3.85 | 23 | 25 |
| 3-3 | 4.25% Methocel 90HG, 100 cps | 600 | | 9.5 | 3.66 | 14 | 28 |
| 3-4 | 1.5% Methocel 90HG, 1,500 cps | 125 | | 9.4 | 3.74 | 15 | 27 |
| 3-5 | 2.0% Methocel 90HG, 1,500 cps | 350 | | 9.4 | 4.17 | 15 | 18 |
| 4-1 | None (control) | | | 9.7 | 4.86 | | |
| 4-2 | 2.5% Methocel 90HG, 100 cps | 40 | 0.14 | 8.5 | 4.48 | 12 | 8 |
| 4-3 | 2.0% Methocel 90HG, 400 cps | 40 | 0.16 | 8.7 | 4.28 | 10 | 12 |
| 5-1 | None (control) | | | 10.3 | 4.97 | | |
| 5-2 | 2.5% Methocel 90HG, 100 cps | 40 | 0.13 | 8.9 | 4.41 | 14 | 11 |
| 5-3 | 2.0% Methocel 90HG, 400 cps | 40 | 0.12 | 5.2 | 4.70 | 50 | 5 |

[1] Methocel 90HG viscosity as 2% aqueous solution at 20° C.
[2] Operational viscosity at treatment temperature.

These tests also revealed a more uniform coating and more rapid drain-off with the solution having an operational viscosity of less than 100 cps. In further tests established a preferred operational viscosity of 40–80 cps.

EXAMPLE 3.—Field tests (A) In a trial by a commercial potato processor, a portion of one par-fry line was diverted between the final blancher and the frier to obtain potato pieces for a test run. The initial potato stock had a raw solids content 18.5 percent. These blanched, sugar-treated pieces were were dipped into a tank containing an aqueous solution of Methocel 90 HG premium, 100 cps., heated at 60–70° C. During the run several concentrations and bath temperatures were used with a contact time of 5–15 sec. The pickup of hydrocolloid in the dip treatment was estimated from the weight gain to be about 0.05–0.2 weight percent. The treated pieces were drained for 15–30 sec., returned to the process line, par-fried and frozen.

The treated par-fries were observed to be lighter and more evenly browned. Also they were less greasy and showed a marked improvement in plate life when served after final cooking. Samples were analyzed for moisture and oil content as described in Example 1. Based on these analyses the par-fry yield, e.g. parts par-fries per 100 parts initial potato, was calculated. Typical results are given in Table 3. Note that the hydrocolloid treatment reduced the oil absorption and also gave a significant increase in yield.

TABLE 3

| Treatment | Par-fries | | |
|---|---|---|---|
| | Percent oil | Percent solids | Yield, percent |
| None (control) | 5.61 | 29.21 | 78.3 |
| 2.5% Methocel 90HG, 62° C | 5.30 | 28.45 | 80.0 |
| 2.5% Methocel 90HG, 68° C | 4.44 | 26.84 | 82.6 |
| 3.0% Methocel 90HG, 68° C | 5.47 | 27.59 | 83.6 |

(B) In a 3 hour test run made by another commercial potato processor, a dip tank was employed to treat bleanched potato strips with an aqueous solution of sugar and Methocel 90 HG premium prior to par-frying. A 2.25 weight percent solution of Methocel 90 HG premium, 100 cps., containing 1.2 weight percent added sugar was used at 70° C. with a contact time of 15–60 sec. When the initial par-fries were found to be darker than desired, the sugar content was reduced by dilution of the solution with a sugar-free 2.25 weight percent aqueous solution of Methocel 90 HG premium.

After adjusting the sugar content, the color of the fried treated strips was a most desirable, uniform, light golden brown. The treated par-fries were noticeably less greasy and had an improved general texture. The interior potato was firm and mealy. On a total solids basis, a 5 percent reduction in the oil content of the treated pieces was found with a concurrent 12 percent increase in the total yield.

(C) In another trial a V-shape dip tank having a chain drag conveyor was used to treat the blanched potato strips with an aqueous solution of Methocel 65 HG premium and sugar. A 1.52 weight percent solution of Methocel 65 HG premium, 400 cps., was used with a tank temperature of 60±1° C. Although some "cob-webbing" was observed suggesting a too high carryout of the hydrocolloid, there was a 5.4 percent reduction in absorbed oil content and an 8 percent increase in yield, e.g., from 784 to 846 lbs., or par-fries per 1,000 lbs. raw potatoes.

(D) In other tests conducted by commercial processors improved results have been obtained by treating the blanched potato strips with aqueous solutions of Methocel 65 HG premium and Methocel 90 HG premium using dip tanks, troughs, flumes and other contacting means. To reduce foaming in the high velocity flume operation it was necessary to add a standard antifoam. A dip tank operation is generally preferred.

I claim:
1. In a process for preparing French fried potato products wherein whole potato pieces are blanched and then fried in deep-fat, the improvement which consists in treating the blanched potato pieces prior to frying with an aqueous solution of an edible, film-forming, water-soluble cellulose derivative to form a thin coating of the cellulose derivative on the potato surface.

2. The process of claim 1 wherein the water-soluble cellulose derivative is an alkyl cellulose ether which forms a thermally reversible gel in aqueous solution.

3. The process of claim 1 wherein the potato pieces are treated at about 50°–95° C. with an aqueous solution of a nonionic alkyl cellulose ether, said solution having an operational viscosity of less than 100 cps.

4. The process of claim 3 wherein the nonionic alkyl cellulose ether is a hydroxypropylmethylcellulose having a thermal gel point greater than 50° C.

5. The process of claim 4 wherein the aqueous solution of hydroxypropylmethylcellulose contains added sugar.

6. In a process for preparing French fried potato products wherein whole potato pieces are blanched and then fried in deep-fat, the improvement which consists essentially in treating the blanched potato pieces at a temperature of about 50°–95° C. with an aqueous solution of a water-soluble, nonionic alkyl cellulose ether having a thermal gel point greater than 50° C. to form a thin coating of the alkyl cellulose ether on the potato surface prior to frying.

7. The process of claim 6 wherein the aqueous solution of the nonionic alkyl cellulose ether contains added sugar.

8. A partially fried potato product prepared from blanched potato pieces having a surface coating of a water-soluble nonionic alkyl cellulose ether with a thermal gel point greater than 50° C. applied thereto prior to frying.

References Cited

UNITED STATES PATENTS

| 2,498,024 | 2/1950 | Baxter | 99—100 |
| 3,085,020 | 4/1963 | Backinger et al. | 99—207 |
| 3,109,739 | 11/1963 | Hilton | 99—100 |
| 3,114,639 | 12/1963 | Rivoche | 99—100 |
| 3,131,068 | 4/1964 | Greif et al. | 99—139 |
| 3,175,914 | 3/1965 | Vahlsing | 99—100 |

A. LOUIS MONACELL, *Primary Examiner.*

D. M. NAFF, *Assistant Examiner.*

U.S. Cl. X.R.

99—168